US012764504B2

(12) United States Patent
Cili et al.

(10) Patent No.: US 12,764,504 B2
(45) Date of Patent: Oct. 13, 2026

(54) SEMANTIC COMMUNICATION FOR LOW BIT RATE APPLICATIONS

(71) Applicant: Apple Inc., Cupertino, CA (US)

(72) Inventors: Gencer Cili, San Jose, CA (US); Zhen Liu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 18/377,731

(22) Filed: Oct. 6, 2023

(65) Prior Publication Data

US 2024/0040344 A1 Feb. 1, 2024

Related U.S. Application Data

(63) Continuation of application No. 17/589,688, filed on Jan. 31, 2022.

(60) Provisional application No. 63/237,982, filed on Aug. 27, 2021.

(51) Int. Cl.
*H04W 4/14* (2009.01)
*H04W 76/50* (2018.01)

(52) U.S. Cl.
CPC ............. *H04W 4/14* (2013.01); *H04W 76/50* (2018.02)

(58) Field of Classification Search
CPC ... H04W 4/14; H04W 76/50; H04W 28/0236; H04W 28/06; H04W 4/12; H04W 4/90; H04W 28/0268; H04L 1/0006; H04L 1/0014; H04L 51/063; G06F 40/242; G06F 40/12; G06F 40/274; G06F 40/289; G06F 40/30; H03M 7/30
See application file for complete search history.

(56) References Cited

U.S. PATENT DOCUMENTS

| | | | | |
|---|---|---|---|---|
| 5,894,506 | A * | 4/1999 | Pinter | H04M 11/022 340/7.53 |
| 10,289,356 | B2 | 5/2019 | Mori | |
| 2002/0026513 | A1* | 2/2002 | Hoglund | H04L 51/00 709/227 |
| 2005/0101287 | A1 | 5/2005 | Jin et al. | |
| 2007/0153775 | A1* | 7/2007 | Renschler | H04L 69/04 370/356 |

(Continued)

FOREIGN PATENT DOCUMENTS

WO WO 2017/198183 11/2017

OTHER PUBLICATIONS

Extended European Search Report in European Appln. No. 22182246.3, dated Dec. 22, 2022, 12 pages.

(Continued)

*Primary Examiner* — Ankur Jain
(74) *Attorney, Agent, or Firm* — Fish & Richardson P.C.

(57) ABSTRACT

Methods, systems, and apparatus, including computer programs encoded on computer storage media, for sending a reduced size message. One of the methods includes receiving, by a wireless device, a request to send, over a wireless network, a message comprising one or more phrases; determining that a connection quality for the wireless network does not satisfy a connection quality threshold; generating, responsive to determining that the connection quality threshold is not satisfied, a reduced-size message based at least in part on the one or more phrases; and sending, by the wireless device and via the wireless network, the reduced-size message.

18 Claims, 5 Drawing Sheets

(56) References Cited

U.S. PATENT DOCUMENTS

| | | | | |
|---|---|---|---|---|
| 2010/0169441 | A1* | 7/2010 | Lafleur | G06F 40/274 709/206 |
| 2013/0065550 | A1 | 3/2013 | Green et al. | |
| 2015/0078402 | A1* | 3/2015 | Diener | H04L 67/52 370/475 |
| 2015/0304983 | A1 | 10/2015 | Krening et al. | |
| 2016/0119266 | A1 | 4/2016 | Krishnamurthy | |
| 2017/0012641 | A1* | 1/2017 | Lee | H03M 7/30 |
| 2017/0171731 | A1 | 6/2017 | Sennett et al. | |
| 2017/0374538 | A1* | 12/2017 | Gellens | H04W 4/48 |
| 2018/0084587 | A1 | 3/2018 | Noor | |
| 2018/0181656 | A1* | 6/2018 | Proctor | G06F 16/345 |
| 2018/0332490 | A1 | 11/2018 | Manepalli et al. | |
| 2019/0109932 | A1 | 4/2019 | Higgins | |
| 2019/0187643 | A1 | 6/2019 | Carpenter et al. | |
| 2021/0243583 | A1* | 8/2021 | Hassan | H04W 4/021 |
| 2021/0250890 | A1 | 8/2021 | Won | |
| 2021/0377860 | A1 | 12/2021 | Ma et al. | |
| 2022/0377519 | A1 | 11/2022 | Lei et al. | |
| 2023/0061828 | A1 | 3/2023 | Cili et al. | |

OTHER PUBLICATIONS

Wikipedia.com [online], “Seq2seq,” Mar. 27, 2021, retrieved on or before Mar. 27, 2021, retrieved from URL <https://en.wikipedia.org/w/index.php?title=Seq2seq&oldid=1014534567>, 3 pages.

Wikipedia.com [online], “Transformer (machine learning model),” Aug. 5, 2021, retrieved on or before Aug. 5, 2021, retrieved from URL <https://en.wikipedia.org/w/index.php?title=Transformer_(machine_learning_model)&oldid=1037249933>, 7 pages.

* cited by examiner

SEMANTIC COMMUNICATION FOR LOW BIT RATE APPLICATIONS

CROSS-REFERENCE TO RELATED APPLICATIONS

The present application is a continuation of, and claims priority to, U.S. patent application Ser. No. 17/589,688, filed Jan. 31, 2022, which claims the benefit of U.S. Provisional Application No. 63/237,982, filed on Aug. 27, 2021 entitled "Semantic Communication For Low Bit Rate Applications," each of which are herein incorporated by reference in their entirety.

TECHNICAL FIELD

This specification relates to systems and techniques for sending messages across networks when there is limited network bandwidth, a high block error rate, or both.

BACKGROUND

Electronic devices can communicate with one another through one or more wireless networks. For example, a device can communicate with another device across a cellular network. The communication can include voice data, message data, or other appropriate types of data.

SUMMARY

A wireless device can determine whether to send a reduced size message across a wireless network when a connection quality with the wireless network does not satisfy a connection quality threshold. For instance, the wireless device can determine that a message satisfies a priority threshold, e.g., is an emergency message, and determine to reduce a size of the message when the connection quality does not satisfy the connection quality threshold. The wireless device can reduce the message size using predetermined codes for one or more predetermined phrases, context aware phrase likelihood prediction, context summaries, message encodings, or a combination of two or more of these. By sending the reduced size message, the wireless device can increase a likelihood that the message is successfully sent across the wireless network to a destination device.

In general, one aspect of the subject matter described in this specification can be embodied in methods that include the actions of receiving, by a wireless device, a request to send, over a wireless network, a message comprising one or more phrases; determining that a connection quality for the wireless network does not satisfy a connection quality threshold; generating, responsive to determining that the connection quality threshold is not satisfied, a reduced-size message based at least in part on the one or more phrases; and sending, by the wireless device and via the wireless network, the reduced-size message. Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, determining that the connection quality threshold is not satisfied can include determining that a network strength indicator associated with the wireless network does not satisfy a network strength indicator threshold.

In some implementations, the method can include determining the connection quality responsive to determining, based at least in part on the message, to treat the message as being associated with an emergency service system. Determining to treat the message as being associated with an emergency service system can be based at least in part on a destination address of the message. Determining to treat the message as being associated with an emergency service system can be based at least in part on an indication that the wireless device attempted to perform an emergency call within a threshold time period of receiving the request to send the message via the wireless network.

In some implementations, the method can include attempting, responsive to receiving the request to send the message, to send the message via the wireless network; and determining that the attempt to send the message via the wireless network was unsuccessful. Determining that the connection quality for the wireless network does not satisfy the connection quality threshold can be responsive to determining that the attempt to send the message via the wireless network was unsuccessful. Generating the reduced-size message can include detecting a predefined phrase in the one or more phrases; and generating the reduced-size message comprising, in a body of the reduced-size message, a bit string that is mapped to the predefined phrase, the bit string having fewer bits than the predefined phrase.

In some implementations, generating the reduced-size message can include predicting, using at least in part a natural language processing model, a likelihood of a next phrase following a phrase of the one or more phrases; determining that the likelihood that the next phrase follows the phrase satisfies a threshold likelihood; determining that the next phrase occurs after the phrase in the one or more phrases; and responsive to determining that the next phrase occurs after the phrase in the one or more phrases and that the threshold likelihood is satisfied, encoding, in a body of the reduced-size message, a representation for the next phrase, the representation having fewer bits than the next phrase. The method can include determining the threshold likelihood based at least in part on a number of characters included in the one or more phrases. The natural language processing model can receive data representing a phrase as input. The natural language processing model can be trained to predict likelihoods that a phrase will occur after the input phrase.

In some implementations, generating the reduced-size message can include predicting, using at least in part a natural language processing model, a likelihood of a next phrase following a phrase of the one or more phrases; determining that the likelihood that the next phrase follows the phrase does not satisfy a threshold likelihood; determining that the next phrase occurs after the phrase in the one or more phrases; and responsive to determining that the likelihood that the next phrase occurs after the phrase in the one or more phrase and that the threshold likelihood is not satisfied, encoding, in the body of the reduced-size message, the phrase. In some examples, when the natural language processing model determines likelihoods for a plurality of phrases from the one or more phrases, the natural language processing model can determine two likelihoods for the same phrase when each of the likelihoods is based at least in part on a different context of the phrase in the one or more phrases. A different context can be a different preceding phrase in the one or more phrases, a different following phrase in the one or more phrases, or both.

In some implementations, generating the reduced-size message can include generating, using a compression engine that produces a human-readable summary from human-readable input, a human-readable summary corresponding to the one or more phrases, the human-readable summary having fewer bits than the one or more phrases; and including the human-readable summary in a body of the reduced-size message. The method can include determining, after sending the reduced-size message, that an updated connection quality for the wireless network satisfies the connection quality threshold; and sending, by the wireless device via the wireless network, a second message based on the message, the second message having more bits than the reduced-size message. The message and the second message can include the same body. The second message can include a reduced-size message that does not include a human-readable summary.

In some implementations, generating the reduced-size message can include providing, as input to an encoder trained to generate a compressed bit stream using at least in part a model, the one or more phrases to cause the encoder to generate a compressed bit stream having fewer bits than the one or more phrases; and generating the reduced-size message comprising the compressed bit stream that can be decoded to produce an uncompressed version of the one or more phrases based at least in part on the model. The request to send the message can request that the message be sent via a cellular network. The request to send the message can request that the message be sent via a satellite network.

The subject matter described in this specification can be implemented in various embodiments and may result in one or more of the following advantages. The systems and methods described in this specification can reduce a message size, creating a reduced size message, for more efficient network bandwidth usage, a reduced block error rate, a reduced delivery latency, an increased successful transfer rate, or a combination of two or more of these. For instance, creating a reduced sized message can reduce a delivery latency, increase a successful transfer rate, or both, while maintaining the same block error rate as other systems. In some examples, use of a longer message, e.g., that is not reduced in size, can incur more retransmissions, which can cause a device sending the longer message to be more likely to hit a maximum retransmission threshold or latency threshold, and thus have higher delivery failure rate, than use of a reduced size message. As a result, use of a reduced size message can increase a likelihood that a device does not hit a maximum retransmission threshold, a latency threshold, or both.

In some implementations, reducing a message size can enable a wireless device to send the reduced size message across a wireless network when the wireless device would otherwise be unable to send a non-reduced size message across the wireless network. This can enable emergency message communications when such communications might otherwise be unavailable. In some implementations, generation, transmission, or both, of a reduced size message can enable the wireless device to send more important messages more quickly, with a higher transmission likelihood, or both, compared to less important messages.

In some implementations, a device that implements the systems and methods described in this specification can have reduced power compared to other devices. For example, a device with a poor wireless network connection, e.g., with difficult radio conditions, can usually have a high transmission ("tx") power usage, which usage can grow proportional to the size of a message the device attempts to send. By reducing the size of the message, the device can reduce the power required to send the message than would be required without a reduced size message. In some implementations, the systems and methods described in this specification can reduce bandwidth occupancy of a network, which can result in reduced network congestion, improved message delivery success rate, improved network latency, or a combination of two or more of these. When a network has a reduced bandwidth occupancy, the network can more efficiently route traffic, serve more devices simultaneously, or both.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Sometimes wireless network connections can be poor. In some examples, a poor connection can be caused by scarce, expensive, or both, wireless network bandwidth. A poor connection can be caused by suboptimal wireless radio conditions. For instance, wireless, e.g., terrestrial and/or non-terrestrial, bandwidth can be scarce in certain geographical locations, such as mountains or valleys, or areas with tree cover. At times, the wireless network can have a high block error rate ("BLER"), which can cause a wireless device to attempt to retransmit a large message more frequently than if the wireless network had a lower BLER.

To increase a likelihood that a message is sent across a poor wireless network connection, a wireless device can reduce a size of the message so that less data need to be sent across the poor wireless network connection. The wireless device can reduce the message size using predetermined codes for predetermined phrases, codes for phrases that satisfy a threshold likelihood of being the next typed phrase, e.g., phrase likelihood prediction, a message summary, message encoding, or a combination of two or more of these. Examples of these processes are described below in more detail.

When the wireless device sends a message summary, the wireless device can later determine whether the wireless connection has improved. If so, the wireless device can send the original message, potentially in a reduced size, e.g., using one or more of the other methods described in this specification instead of a message summary. The reduced size message includes fewer bits or bytes than the original message.

In some implementations, the wireless device can use multiple different connection quality thresholds. Depending on the connection quality thresholds that are not satisfied, the wireless device can use a different process by which to reduce the message size. For instance, when the connection quality does not satisfy a lowest connection quality threshold, e.g., is less than or equal to or either, the wireless device can use at least a message summarization process to reduce the message size. When the connection quality satisfies the lowest connection quality threshold, e.g., is greater than or equal to or either, but does not satisfy another connection quality threshold, the wireless device can use at least predetermined codes for predetermined phrases to generate the reduced size message.

Figure 1:
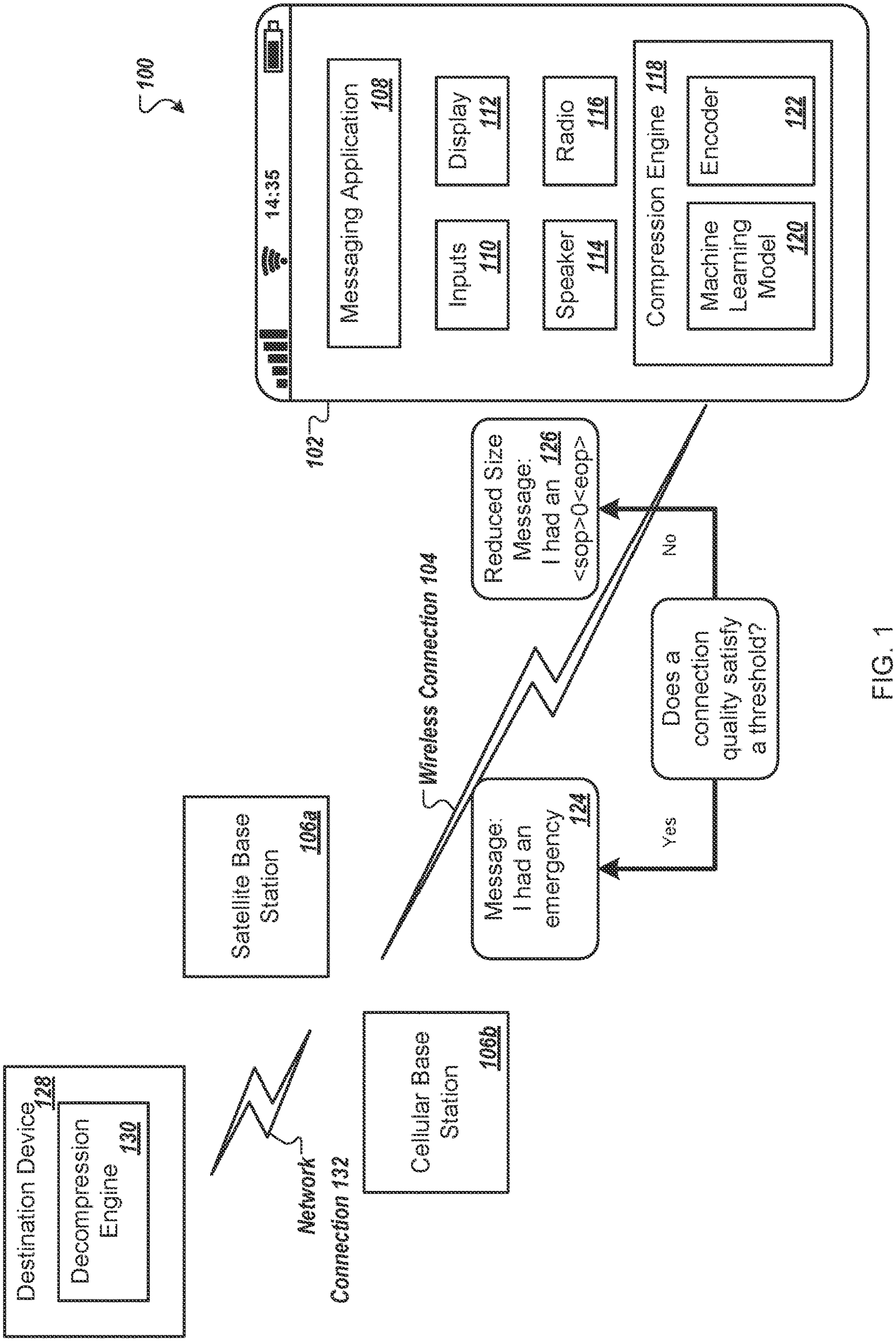
FIG. 1 depicts an example environment in which a wireless device uses a wireless connection to connect with a base station.

FIG. 1 depicts an example environment 100 in which a wireless device 102 uses a wireless connection 104 to connect with a base station 106*a-b*. The wireless device 102 can analyze a connection quality for the wireless connection 104 to determine whether to send a reduced size message via the wireless connection 104.

For example, the wireless device 102 can include a messaging application 108. The messaging application 108 can be any appropriate type of messaging application, such as a text messaging application, an instant messaging application, or another type of real-time messaging application.

The wireless device 102 can use the messaging application 108 for communication with other devices, such as a destination device 128, using the wireless connection 104. For instance, the wireless device 102 can use the messaging application 108 to send messages to the destination device 128 operated by a user's friend, family member, or coworker. In some examples, the wireless device 102 can use the messaging application 108 to communicate with an emergency services system that includes the destination device 128.

The wireless device 102 includes input devices 110 configured to enable a user to enter a message into the messaging application 108. The input devices 110 can include a keyboard, a mouse, a tactile input, a microphone, or a combination of these, to name a few examples. The keyboard can be a touch screen keyboard, a hardware keyboard, or any other appropriate type of keyboard.

The wireless device 102 can include a display 112 on which content is presented. For instance, the wireless device 102 can present a user interface for the messaging application 108 on the display 112. The display 112 can be any appropriate type of display, such as a touch screen display.

In some examples, the wireless device 102 can include a speaker 114. The wireless device 102 can include the speaker 114 instead of or in addition to the display 112. The wireless device 102 can use the speaker 114 to present audible content to a user. For example, the wireless device 102 can receive a message for the messaging application 108 and present content for the message using the speaker 114, the display 112, or both.

The wireless device 102 includes a wireless radio 116. The wireless radio 116 is configured to enable the wireless device 102 to communicate using the wireless connection 104. Some examples of the wireless radio 116 can include a radio that enables the wireless device 102 to connect to a non-terrestrial, e.g., satellite and/or high altitude platform ("HAP"), base station 106*a*, a cellular radio that enables the wireless device 102 to connect to a cellular base station 106*b*, or both.

The wireless device 102 includes a compression engine 118. The compression engine 118, or another component in the wireless device 102, can determine whether to send a reduced size message. For instance, the compression engine 118 can receive, from a component in the wireless device 102, e.g., the wireless radio 116, connection quality data. The connection quality data can be a network strength indicator for the wireless connection 104, such as a received signal strength indicator ("RSSI").

The wireless device 102, e.g., the compression engine 118, can compare the connection quality data with a connection quality threshold. Based on the result of the comparison, the wireless device 102 can determine whether to reduce a size of a message for the messaging application 108.

For example, the wireless device 102 can receive data from the messaging application 108 that identifies a message 124 the messaging application 108 is attempting to send. The data can indicate an intended destination device, e.g., the destination device 128, for the message 124. For instance, the data can include a destination address for the message 124. The destination address can be any appropriate type of address, such as a phone number, an email address, an IP address, or another appropriate address. When the message 124 is "I had an emergency", the destination address can identify an emergency services system.

The wireless device 102 can receive a connection quality for the wireless connection 104, e.g., from the wireless radio 116, across which the message 124 can be sent. The wireless device 102 can compare the connection quality for the wireless connection 104 with the connection quality threshold. For example, when the connection quality is a numerical value, the wireless device 102 can compare the numerical value for the connection quality with another numerical value for the connection quality threshold.

When the wireless device 102 determines that the connection quality satisfies the connection quality threshold, e.g., is greater than or equal to or either, the wireless device 102 can send the message 124. For instance, the wireless device 102 can use the wireless radio 116 to send the message 124 via the wireless connection 104. The sent message 124 can be in an uncompressed format, or in another normal format for the messaging application 108, depending on how messages for the messaging application 108 are sent across a network.

When the wireless device 102 determines that the connection quality does not satisfy the connection quality threshold, e.g., is less than or equal to or either, the wireless device 102 can determine to use the compression engine 118 to generate a reduced size message 126. The compression engine 118 can use the connection quality threshold that is not satisfied, a degree to which the connection quality does not satisfy the connection quality threshold, an importance for the message 124, a length of the message 124, or a combination of these to determine a type of compression to use. For instance, when the connection quality is closer to the connection quality threshold, the compression engine 118 can select a faster compression process, a process that does not compress a message as much, or a process that does both, compared to when the connection quality is further from the connection quality threshold. When the connection quality is further from the connection quality threshold, the compression engine 118 can select a process that is slower, compresses more, or both, compared to when the connection quality is closer to the connection quality threshold.

In the example shown in FIG. 1, the compression engine 118 uses a predetermined code to compress the message 124. For instance, the compression engine 118 can include a database that maps predetermined phrases with predetermined codes. When the compression engine 118 receives a message 124 to compress, the compression engine 118 can analyze the text of the message 124 to determine whether the text of the message 124 includes any of the predetermined phrases and replace any occurrences of the predetermined phrases with corresponding predetermined codes from the database.

Figure 2:
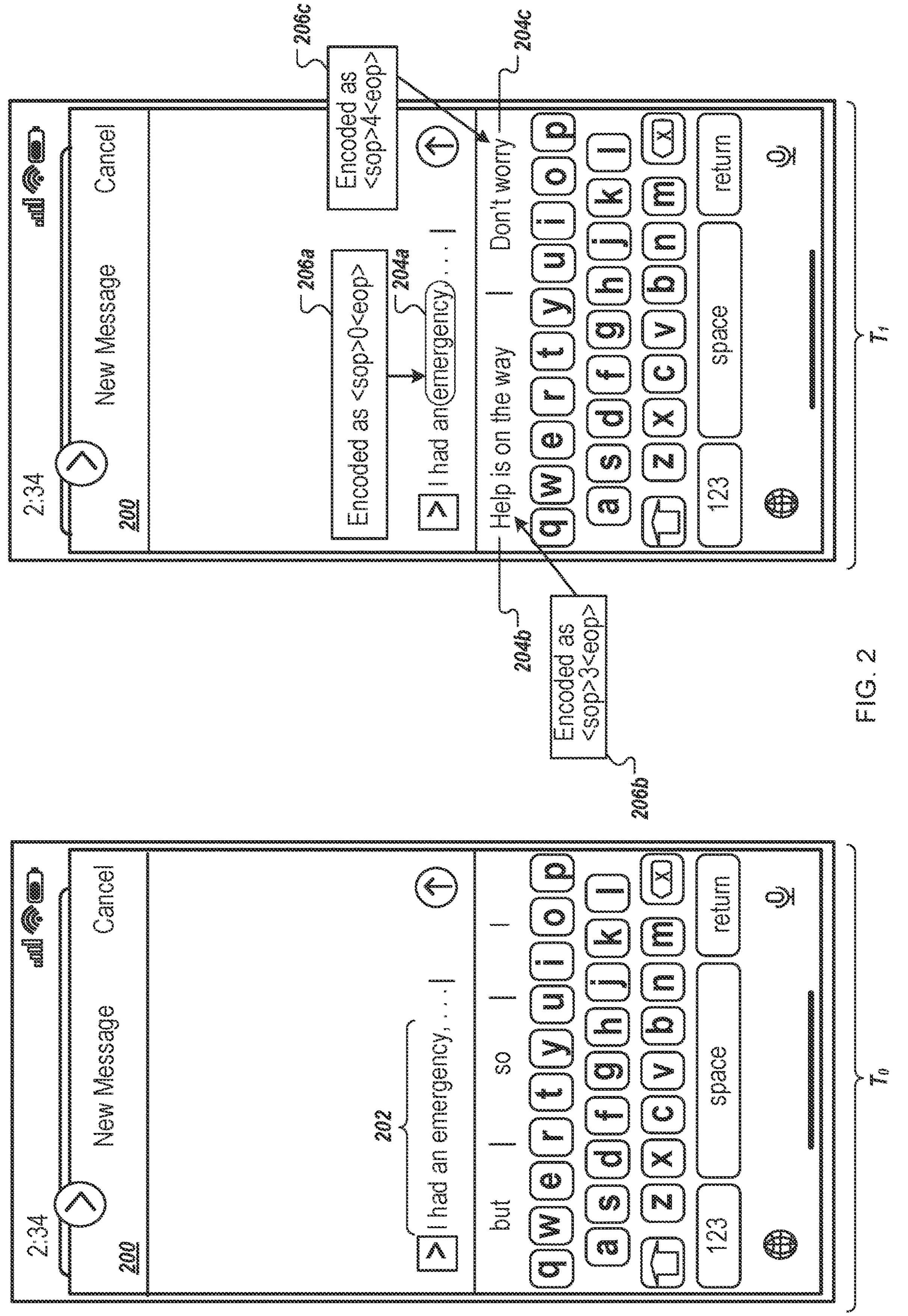
FIG. 2 depicts some examples of predetermined phrases with corresponding codes.

FIG. 2 depicts some examples of predetermined phrases with corresponding codes. In FIG. 2, the wireless device 102 presents a user interface 200 through which the wireless device 102 receives input 202 of "I had an emergency" for the message 124 during time $T_0$.

During time $T_1$, the compression engine 118 can determine whether the input 202 includes any predetermined phrases. For instance, when the compression engine 118 determines that the input 202 includes a predetermined phrase 204*a*, such as "emergency", the compression engine 118 can replace, in a body of the message 124 or in the input 202, the predetermined phrase 204*a* with predetermined code 206*a* that corresponds to the predetermined phrase 204*a* in the mapping, e.g., by accessing the mapping using the predetermined phrase 204*a* as a key. In this example, the compression engine 118 replaces the predetermined phrase 204*a* "emergency" with the predetermined code 206*a* "<sop>0<eop>" to generate the reduced size message 126. In the predetermined code, "sop" represents "start of phrase" and "eop" represents "end of phrase". Other identifiers can be used to indicate the beginning and the end of the predetermined code.

By sending the predetermined code "<sop>0<eop>" instead of the predetermined phrase, e.g., word, "emergency", the compression engine 118 can reduce a size for the message 124 from 18 characters to 12 characters in the reduced size message 126. By reducing an amount of data to be transferred, the wireless device 102 can increase a likelihood that the reduced size message 126 is successfully received by the destination device 128 compared to the message 124.

Some other predetermined phrases 204*b-c* can include "Help is on the way" 204*b* and "Don't worry" 204*c*. The predetermined phrases can include a single word. The predetermined phrases can include two or more words. Corresponding predetermined codes 206*b-c* for these predetermined phrases 204*b-c* can include "3" and "4". Although these predetermined phrases 204*b-c* are likely to be received by the wireless device 102 rather than sent by the wireless device 102 as shown in FIG. 2, these predetermined phrases 204*b-c* are shown as examples of codes. Further, the wireless device 102 can include these predetermined phrases 204*b-c* in the mapping so that when the wireless device 102 receives the corresponding predetermined codes 206*b-c* from the destination device 128 in a response, the wireless device 102 is able to decode these predetermined codes 206*b-c*.

In some examples, the wireless device 102, e.g., the compression engine 118, can include the predetermined codes 206*a-c* in a body of the reduced size message 126, e.g., in the same position of the body of the message with respect to other phrases in the body as the corresponding predetermined phrase 204*a-c* that the predetermined code 206*a-c* is replacing. The predetermined codes 206*a-c*, e.g., a bit string representing the predetermined code, can have fewer characters, fewer bits, fewer bytes, or a combination of these, than the corresponding predetermined phrase.

Returning to FIG. 1, the destination device 128 can receive the reduced size message 126, e.g., using a network connection 132. The destination device 128 can provide the reduced size message 126 to a decompression engine 130 that recreates the message 124. For instance, the decompression engine 130 can access its own copy of the mapping that associates the predetermined phrase with the predetermined code using the code as the key. The decompression engine 130 can then generate the message 124, or another message, that includes "I had an emergency" in the body of the message 124. The destination device 128 can then perform an action using the message 124, such as presenting the message 124, e.g., on a display or using a speaker, or performing an automated action. The destination device 128 can present the message on a display, e.g., to an emergency services person. An automated action can include sending an instruction for an emergency vehicle to be dispatched to a physical location near a physical location of the wireless device 102.

In some implementations, the predetermined phrases can be frequently used phrases, or frequently used phrases in a particular context, e.g., an emergency situation. For instance, a system can analyze multiple messages, e.g., for the messaging application 108 or multiple messaging applications, to determine a phrase included in messages and a frequency that the phrase occurs in the messages. When the frequency satisfies a threshold frequency, such as a number of occurrences or a percentage of messages in which the phrase occurred, the system can add the phrase and a corresponding code to a mapping. The compression engine 118 can then receive the mapping from the system which mapping identifies frequently used phrases and corresponding codes.

When the compression engine 118 generates reduced size messages 126, the compression engine 118 can access the mapping to determine the corresponding code and include the code in the body of the reduced size message 126 instead of the corresponding frequently used phrase. The destination device 128 can then use the same mapping, e.g., generated by the system, to decompress the message with the decompression engine 130 by using the code as the key for the mapping.

Figure 3:
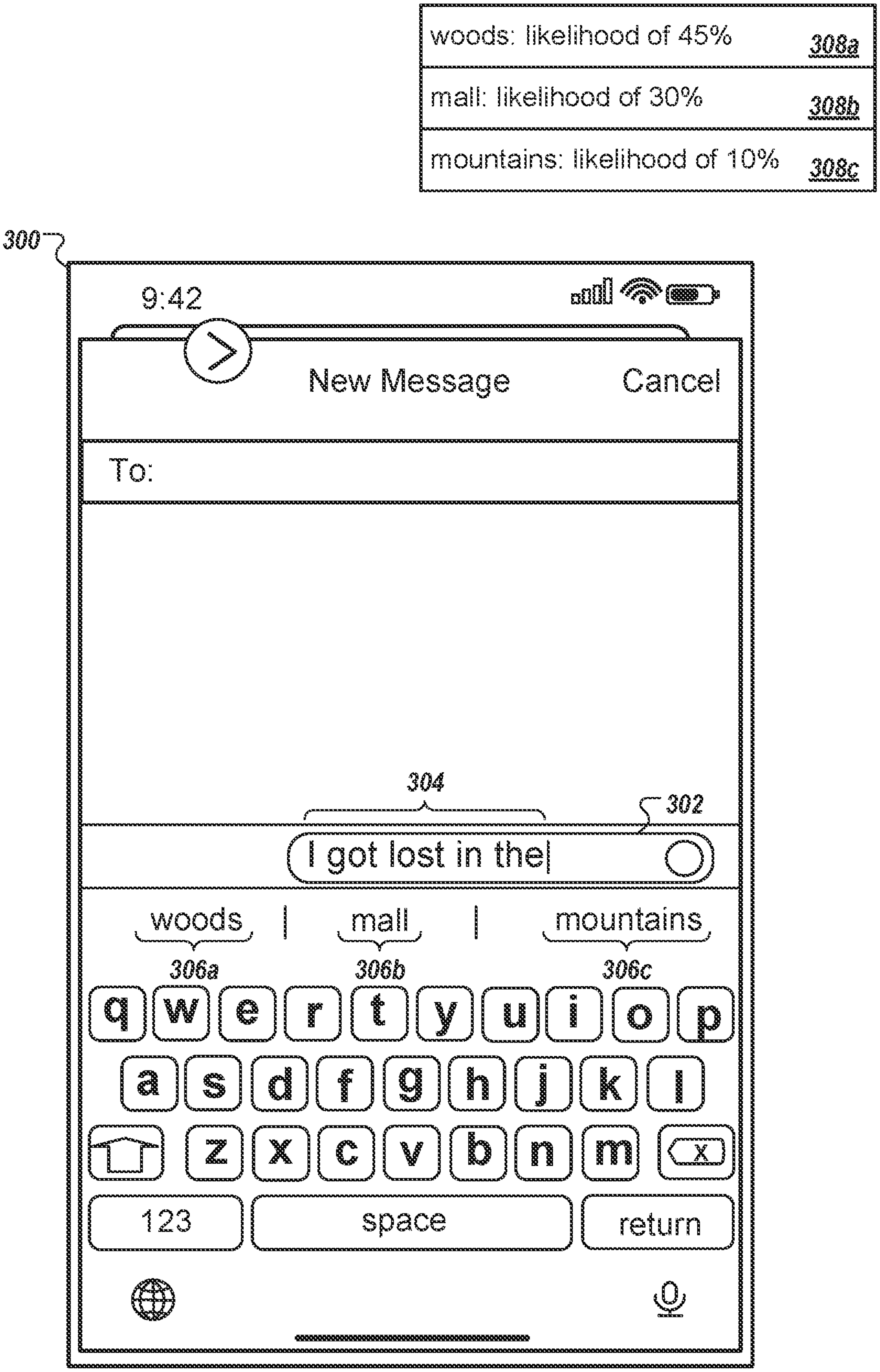
FIG. 3 depicts an example of a user interface with phrase likelihood prediction.

The compression engine 118 can use codes for phrases that have at least a threshold likelihood of occurring next after a preceding phrase to generate the reduced size message 126. FIG. 3 depicts an example of a user interface 300 with phrase likelihood prediction. The user interface 300 is for a messaging application, e.g., the messaging application 108. The user interface 300 includes a message entry field 302. In FIG. 3, the message entry field 302 includes text for a preceding phrase 304 of "I got lost in the".

The wireless device, e.g., the compression engine, can use the preceding phrase 304 to predict a likelihood of a subsequent phrase 306*a-c*. Here, the subsequent phrases 306*a-c* are "woods", "mall", and "mountains". In some examples, at least some of the subsequent phrases 306*a-c* can include two or more words. Some of the subsequent phrases 306*a-c* can include only a single word.

The likelihoods 308*a-c* that the respective subsequent phrases 306*a-c* occur after the preceding phrase 304 are 45%, 30%, and 10%, respectively. That is, given the preceding phrase 304 of "I got lost in the", there is a 45% likelihood that the subsequent phrase will be "woods," a 30% likelihood that the subsequent phrase will be "mall,"

and a 10% likelihood that the subsequent phrase will be "mountains." The remaining 15% can correspond to other phrases. The likelihoods can be normalized likelihoods, e.g., using the likelihoods for a quantity, e.g., a predetermined quantity, of the top ranked phrases.

The wireless device, e.g., the compression engine, can determine the likelihoods using a natural language processing ("NLP") model. The wireless device can receive the NPL model from a system that trained the NLP model or otherwise stored the NLP model in memory. In some examples, the system can train the NLP model using a particular context, e.g., an emergency context. For instance, rather than train the NLP model to predict subsequent phrase likelihoods in any context, the system can train the NLP model to predict subsequent phrase likelihoods in emergency situations. In these examples, the wireless device can use the NLP model to compress emergency messages.

When generating the reduced size message, the compression engine can use Huffman Coding, or another appropriate type of encoding given the likelihoods for the subsequent phrase 306*a-c*, for the subsequent phrases. For instance, for the message "I got lost in the woods", the compression engine can generate a reduced size message with a body of "I got lost in the <p>0<p>", where "p" indicates the use of a likelihood encoding. For the message "I got lost in the mall", the compression engine can generate a reduced size message with a body of "I got lost in the <p>1<p>". For the message "I got lost in the mountains", the compression engine can generate a reduced size message with a body of "I got lost in the <p>10<p>".

When the compression engine determines that the subsequent phrase does not have at least a threshold likelihood of following the preceding phrase, the compression engine can determine to skip replacing the subsequent phrase with an encoding. For example, when the message is "I got lost in the car" when "car" has a 0.05% likelihood of following the preceding phrase "I got lost in the", the compression engine can determine to skip compressing the message, can determine to skip compressing the subsequent phrase, can determine to skip compressing the subsequent phrase using phrase likelihood prediction, or a combination of two or more of these. For instance, the compression engine can determine to skip compressing the subsequent phrase using phrase likelihood prediction, e.g., while also determining to reduce the message size using a message summary, message encoding, or both.

The compression engine can use a static threshold likelihood or a dynamic threshold likelihood for encoding using phrases. When using a static threshold likelihood, the compression engine can use a predetermined threshold likelihood, e.g., entered by a developer. Some example static threshold likelihoods include 5% or 10%.

When using a dynamic threshold likelihood, the compression engine can use a lower threshold likelihood when the connection quality is lower and use a higher threshold likelihood when the connection quality is higher. This can enable the wireless device to compress a message more for worse connections than for better quality connections.

In some examples, the compression engine can determine a threshold likelihood based on a type of the message. For instance, when the wireless device determines that the message has an extremely high priority, e.g., the emergency situation is more severe, the wireless device can use a higher threshold likelihood to reduce a time for generating the reduced size message compared to when the message has a lower priority, e.g., and there is no emergency situation or the emergency situation is less severe.

Returning to FIG. 1, the compression engine 118 can generate a message summary for the message 124. The message summary can be a human-readable summary generated based on the body of the message 124. The compression engine 118 can use the message summary as the reduced size message 126, optionally along with one or more of the other processes described in this specification to reduce the size of the message 124.

For example, the compression engine 118 can include a machine learning model 120 that receives, as input, a phrase. The phrase can be the body of the message 124, e.g., "I had an emergency", or a portion of the body of the message 124. The compression engine 118 can provide the input phrase to the machine learning model 120. Some examples of the machine learning model 120 can include a seq2seq model, a transformer model, a neural network, e.g., a deep neural network, or another appropriate model.

The machine learning model 120 can be trained to generate a summary, e.g., a human-readable summary, of the input phrase. For instance, a system can train the machine learning model 120 as a text summarization model. The system can provide the machine learning model 120 text input and expected output to train the machine learning model 120 to summarize text. In some examples, the system can train the machine learning model 120 to summarize text about emergency situations.

The compression engine 118 receives, from the machine learning model 120, a summary of the body of the message 124, e.g., a message summary. For example, for the message "I had an emergency", the compression engine 118 can receive the summary "emergency".

The message summary has fewer bits or bytes than the input from which the summary was generated. For instance, for the input phrase "I had an emergency", the machine learning model 120 can generate the message summary "emergency" that has fewer bits and bytes than the input phrase.

When the destination device 128 receives a message summary, the destination device 128 might not use the decompression engine 130 to decompress the message summary. For example, since the message summary contains human-readable text, the destination device 128 can present the body of the message summary, e.g., "emergency," on a display and need not use the decompression engine 130 to decompress the message summary.

In some examples, the destination device 128 uses the decompression engine 130 to decompress the message summary. For instance, when the message summary is reduced in size using one or more other processes, the decompression engine 130 can use a corresponding process to determine the human-readable message summary.

The compression engine 118 can perform one or more other processes on the received message summary. For instance, the compression engine 118 can use predetermined phrases, phrase likelihood prediction, message encoding, or a combination of two or more of these, on the message summary.

When the wireless device 102 determines that the connection quality for the wireless connection 104 satisfies the connection quality threshold, the wireless device 102 can send a non-summarized message. For example, the wireless device 102 can send the message 124 or the reduced size message 126 after sending the message summary.

Specifically, the wireless device 102 can determine that the connection quality does not satisfy the connection quality threshold. As a result, the compression engine 118 can generate the message summary. The wireless device 102 can send the message summary via the wireless connection 104 to the destination device 128.

The destination device 128 can receive the message summary. The destination device 128 can provide the message summary to the decompression engine 130, e.g., when the message summary was reduced in size using another appropriate process. The destination device 128 can then perform an action based on the message summary, e.g., an automated action, present the message summary in a user interface, or both.

When the wireless device 102 determines that the connection quality satisfies the connection quality threshold, the wireless device 102 can determine to send a non-summarized message to the destination device 128. For instance, the wireless device 102 can determine to send the message 124, the reduced size message 126, or both, to the destination device 128. Here, the wireless device 102 would generate the reduced size message 126 using a process other than message summary generation. In some examples, the wireless device 102 can send both the message 124 and the reduced size message 126 when the wireless device 102 has multiple connection quality thresholds.

In some implementations, the wireless device 102 can have multiple connection quality thresholds. For instance, the wireless device 102 can have two or more connection quality thresholds. The two or more connection quality thresholds can include a highest connection quality threshold and a lowest connection quality threshold. The wireless device 102 can compare a connection quality of the wireless connection 104 for sending the message 124 to one or more of the two or more connection quality thresholds. This can include the wireless device 102 comparing the connection quality to the highest connection quality threshold. If the connection quality satisfies, e.g., is greater than or equal to or either, the highest connection quality threshold, the wireless device 102 can determine to send the message 124, e.g., a non-reduced size message. The non-reduced size message can be a message generated by default by the messaging application 108, not reduced in size by the processes described in this specification, or both. The message generated by default by the messaging application 108 can use one or more compression methods specific to the messaging application 108 that are always performed on messages for the messaging application and that are separate from the compression methods described with respect to the compression engine 118.

If the connection quality does not satisfy, e.g., is less than or equal to or either, the highest connection quality threshold, the wireless device 102 can determine to send a reduced size message 126. The wireless device 102 can compare the connection quality to others of the two or more connection quality thresholds, other than the highest connection quality threshold, to determine a process by which to generate the reduced size message 126.

The wireless device 102 can compare the connection quality to the lowest connection quality threshold. If the connection quality satisfies the lowest connection quality threshold, while not satisfying the highest connection quality threshold, the wireless device 102 can determine to generate a reduced size message 126 that has a larger size than a most compressed reduced size message. For instance, the wireless device 102 can determine to use predetermined phrases, phrase likelihood prediction, or both, to generate the reduced size message, e.g., rather than a message summary, message encoding, or both.

When the connection quality does not satisfy the lowest connection quality threshold, the wireless device 102 can determine to generate a reduced size message 126 that has a smaller size than if the connection quality satisfied the lowest connection quality threshold. For example, the wireless device can determine to generate a message summary, use message encoding, or both, to generate the reduced size message 126.

In some implementations, the compression engine 118 can use message encoding to generate the reduced size message 126. The compression engine 118 can include an encoder 122 that generates the reduced size message 126. In these implementations, the reduced size message 126 includes a message but does not include reconstruction information. Instead, the destination device 128 includes a decompression engine 130 with a decoder that corresponds to the encoder 122. For instance, the decoder is implemented to reconstruct the message 124 from the encoded, reduced size message 126. This can include the decoder recovering the uncompressed original message 124 body, e.g., the recover the one or more phrases from the body of the message 124.

The encoder 122 can use any appropriate method to compress the message 124 when generating the reduced size message 126. The encoder 122 can use a lossless compression process by which the decoder, at the destination device 128, is able to decompress the reduced size message 126 without any loss of the content of the message 124, e.g., "I had an emergency". In some examples, the encoder 122 can use a lossy compression process.

In some examples, a system trains the encoder 122 to generate a compressed bit stream using at least in part a model. The system can train the decoder to generate a decompressed bit stream using at least in part the model, e.g., that was used to train the encoder 122. The system can train the encoder 122 to generate the compressed bit stream from an input that includes one or more phrases, e.g., from the body of the message 124. The compressed bit stream has fewer bits or bytes than the one or more input phrases.

In some implementations, the wireless device 102 can determine whether to generate the reduced size message 126 based on the destination for the message 124. For instance, the wireless device 102 can generate the reduced size message 126, e.g., that can have a higher successful transmission likelihood than the message 124 because of its smaller size, when the destination is an emergency service system; an emergency contact for the wireless device 102, e.g., included in a contacts list for the wireless device 102; a frequently called contact for the wireless device 102; a destination that the wireless device 102 knows has a corresponding decompression engine 130; or a destination that is any of a combination of two or more of these. In some examples, the wireless device 102 can determine to generate the reduced size message 126 when the destination for the message 124 is any contact for the wireless device 102.

The wireless device 102 can include a personal computer, a mobile communication device, a machine, or another device that can send and receive data over the wireless connection 104. The wireless connection 104 can be part of a network, such as a wide area network ("WAN"), the Internet, a terrestrial network, a non-terrestrial network, or a combination these, that connects the wireless device 102, one or both of the base stations 106*a-b*, and the destination device 128. For instance, the network can include the network connection 132, e.g., a wired or wireless network connection 132. The network connection 132 can be part of a local area network ("LAN"), WAN, the Internet, a terrestrial network, a non-terrestrial network, or a combination of these.

The wireless device 102 can include several different functional components, including the compression engine 118. The compression engine 118 can include one or more data processing apparatuses. For instance, the compression engine 118 can include one or more data processors and instructions that cause the one or more data processors to perform the operations discussed herein.

The destination device 128 can include several different functional components, including the decompression engine 130. The decompression engine 130 can include one or more data processing apparatuses. For instance, the decompression engine 130 can include one or more data processors and instructions that cause the one or more data processors to perform the operations discussed herein.

Figure 4:
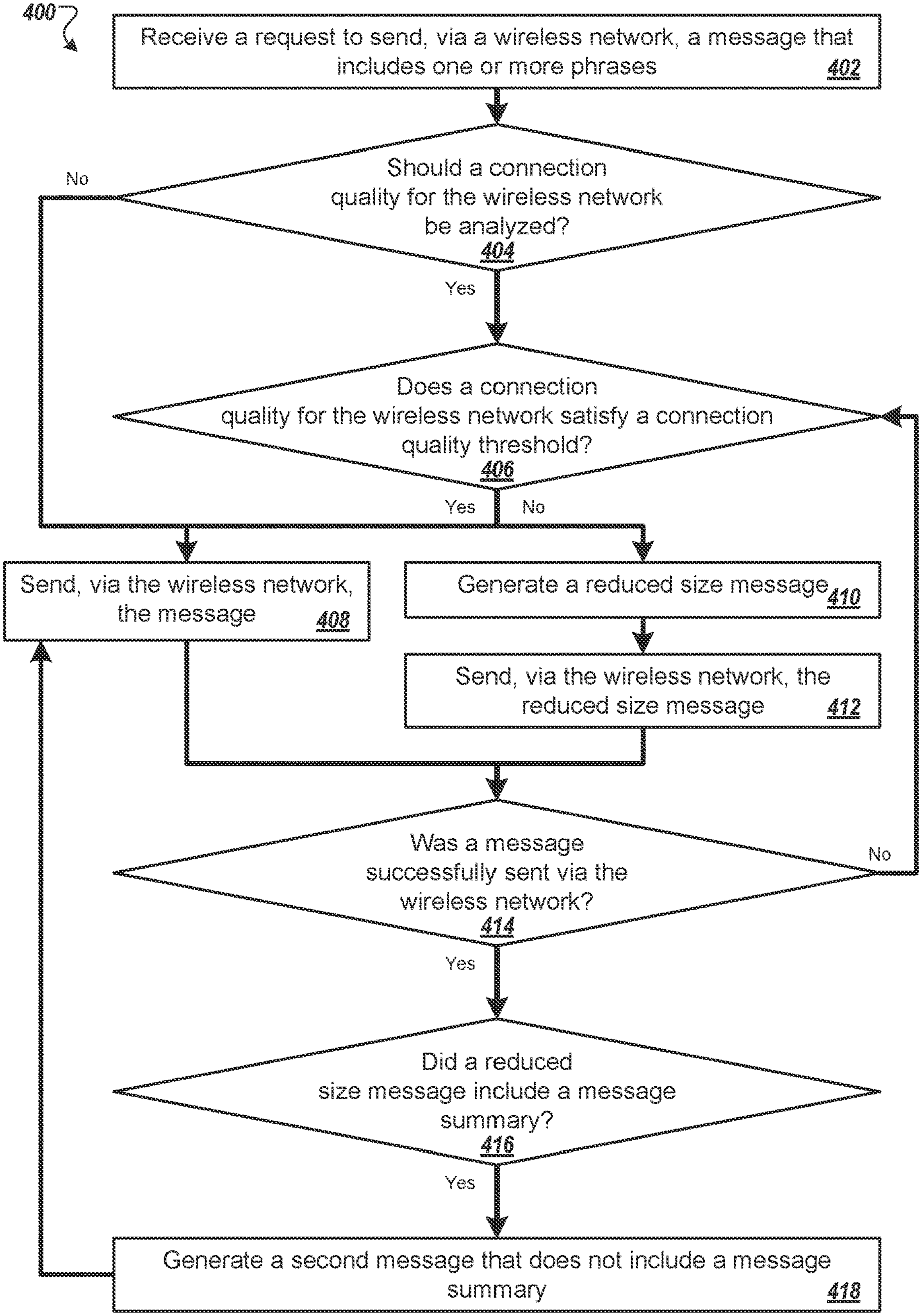
FIG. 4 is a flow diagram of a process for determining whether to send a reduced size message.

FIG. 4 is a flow diagram of a process 400 for determining whether to send a reduced size message. For example, the process 400 can be used by the wireless device 102 from the environment 100.

A wireless device receives a request to send, via a wireless network, a message that includes one or more phrases (402). For instance, the wireless device receives the request from an application, e.g., a messaging application or another application, that is executing on the wireless device. The message can be any appropriate type of message, such as an email, a text message, an instant message, or an emergency services message for an emergency services application.

The wireless device determines whether a connection quality for the wireless network should be analyzed (404). For example, the wireless device can determine using a destination for the message, content of the message, or both, whether a connection quality for the wireless network should be analyzed. This can enable the wireless device to send more important messages more quickly, with a higher transmission likelihood, or both, compared to less important messages. For instance, the wireless device can send messages with a smaller size more quickly or with a higher transmission likelihood because the smaller size reduces the number of bits to transmit and that could be lost during transmission.

The wireless device can determine that the wireless device should analyze the connection quality when the destination indicates an emergency service system, e.g., an emergency dispatch device, a contact for the wireless device, an emergency contact for the wireless device, or a combination of these. In response to determining that the destination indicates one or more of these particular destinations, the wireless device can determine a connection quality for the wireless network across which the message is identified to be sent.

In some examples, the wireless device can determine to analyze the connection quality when the wireless device attempted to make or made a call within a predetermined period of time, to a particular destination, or both. For instance, the wireless device can determine to analyze the connection quality when the wireless device determines that it attempted to or likely attempted to perform an emergency call, e.g., to an emergency service system or an emergency contact or either, with in a threshold period of time from receipt of the request to send the message across the network.

The threshold period of time can be static or dynamic. For example, the threshold period of time can be a fixed value, e.g., determined by a developer, a user of the wireless device, or another appropriate entity. The wireless device can dynamically determine the threshold period of time using, at least in part, the destination for the message or the emergency call, or both. The wireless device can dynamically determine the threshold period of time using, at least in part, a time of day during which the wireless device receives the request. For instance, the threshold period of time can be longer during the evening and at night compared to during the day. The threshold period of time can be longer when it is darker outside, e.g., when it is raining, compared to when it is lighter outside, e.g., on a sunny day.

The wireless device can use content of the message to determine whether to analyze the connection quality. For instance, the wireless device can determine whether one or more key phrases are included in a body of the message. If so, the wireless device can determine to analyze the connection quality. If the wireless device determines that the body of the message does not include any of the key phrases, the wireless device can determine to skip analyzing the connection quality. The key phrases can relate to a particular context, e.g., an emergency situation.

The wireless device determines whether a connection quality for the wireless network satisfies a connection quality threshold (406). For example, responsive to determining that the connection quality should be analyzed, the wireless device can determine the connection quality. The wireless device can then determine whether the connection quality satisfies the connection quality threshold. In some examples, the wireless device can determine whether the connection quality satisfies one or more of multiple different connection quality thresholds.

The wireless device sends, via the wireless network, the message (408). For example, responsive to determining that the connection quality for the wireless network satisfies the connection quality threshold, the wireless device sends the message via the wireless network. The wireless device can send the message using a default or otherwise normal messaging protocol for the wireless device, for the application from which the wireless device received the request, or both. This can include sending the message in a default format for the application, e.g., without generating a reduced size message using the compression engine though this can include use of various compression, encryption, or both, protocols for the application itself.

The wireless device generates a reduced size message (410). For instance, responsive to determining that the connection quality for the wireless network does not satisfy the connection quality threshold, the wireless device generates the reduced size message. The wireless device can generate the reduced size message as described above. For instance, the wireless device can generate the reduced size message using predetermined codes for predetermined phrases, codes for phrases that satisfy a threshold likelihood of being the next typed phrase, e.g., phrase likelihood prediction, a message summary, message encoding, or a combination of two or more of these.

As part of a phrase likelihood prediction process, the wireless device can use at least in part a natural language processing model that receives the phrase as input and is trained to predict likelihoods that a set of predetermined phrases, such as a set of emergency phrases, will occur after an input phrase. This can include providing a phrase to the natural language processing model and receive a likelihood as output. Although this specification describes emergency phrases in various examples, other types of predetermined phrases can be used, such as predetermined driving direction phrases, predetermined assistance phrases, or other appropriate types of predetermined phrases.

The wireless device can perform phrase likelihood prediction for each of one or more phrases, e.g., for all of the phrases, included in the message. For instance, the wireless device can determine, for each of the one or more phrases, a likelihood that an emergency phrase is the next phrase after the corresponding phrase. The wireless device can determine whether the likelihood that the emergency phrase is the next phrase after the corresponding phrase satisfies a threshold likelihood. The wireless device can determine that the emergency phrase occurs after the corresponding phrase. Responsive to determining that the likelihood that the emergency phrase is the next phrase after the corresponding phrase satisfies the threshold likelihood and determining that the emergency phrase occurs after the corresponding phrase, the wireless device can encode, in a body of a reduced size message, a representation for the emergency phrase, e.g., "<p>0<p>". The representation has fewer bits or bytes than the emergency phrase, resulting in the reduced size message having fewer bits or bytes than the original message. Responsive to determining that the emergency phrase does not occur after the corresponding phrase, the wireless device can encode, in a body of a reduced size message, the next phrase after the corresponding phrase.

The wireless device can use a static or a dynamic threshold likelihood. For instance, a static threshold likelihood can be the same for all message analysis, e.g., a predetermined value set by a developer. The wireless device can determine a dynamic threshold likelihood using, at least in part, a number of characters included in the one or more phrases, the connection quality for the wireless network, or both.

In some examples, the next phrase might have a likelihood of coming after the preceding phrase that does not satisfy the threshold likelihood, e.g., that is less than, equal to, or either, the threshold likelihood. In these examples, responsive to determining that the likelihood that the emergency phrase is the next phrase after the corresponding phrase does not satisfy the threshold likelihood and determining that the emergency phrase occurs after the corresponding phrase, the wireless device can encode, in the body of the reduced size message, the emergency phrase. Specifically, the wireless device can encode, in the reduced size message, a phrase with the same number of bits that the phrase would have had in the original message.

In some implementations, the wireless device can determine whether a size reduction process successfully reduced the size of the message. For instance, when the wireless device attempts to reduce the size of a message using predetermined phrases, phrase likelihood prediction, or both, the wireless device can determine whether the generated message has the same size as, or a size within a threshold amount of, the original message. When the generated message does not have the same size as, or a size within a threshold amount of, the original message's size, the wireless device can determine that the size reduction process successfully reduced the size of the message. In response, the wireless device can determine to send the reduced size message to a destination device.

When the generated message has the same size as, or a size within the threshold amount of, the original message's size, the wireless device can determine that the size reduction process did not successfully reduce the size of the message. In response, the wireless device can select another process by which to reduce the size of the original message, e.g., using a message summary, message encoding, another process, or a combination of two or more of these.

The wireless device sends, via the wireless network, the reduced size message (412). For instance, responsive to generating the reduced size message, the wireless device can send the reduced size message to a destination device, e.g., identified by a destination in the original message, the reduced size message, or both.

The wireless device determines whether a message was successfully sent via the wireless network (414). The message can be the original message, e.g., for which the request was received in step 402, or the reduced size message. The wireless device can determine whether the message was successfully sent using data received from a base station or another device to which the wireless device connects. The data can include a confirmation that indicates that the base station or the other device successfully received the message.

Responsive to determining that the message was not successfully sent across the network, the wireless device can determine whether the connection quality for the wireless network satisfies a connection quality threshold, e.g., proceeds to step 406. For instance, when the wireless device sent the reduced size message, the wireless device can determine whether it should attempt to resend the reduced size message or the original message based at least in part on the connection quality. In some examples, if the wireless device determines to send a reduced size message again, the wireless device can further reduce the size of the message and send the further reduced size message.

In some implementations, after performing step 414 and determining that the message was successfully sent via the wireless network, the wireless device can stop performing the process 400. For instance, the wireless device can wait to receive another message send request from the messaging application or another application, wait to receive a message from the destination device, or perform another appropriate process.

The wireless device determines whether a reduced size message included a message summary (416). For example, when the wireless device successfully sent a reduced size message, e.g., in step 414, the wireless device can determine whether the reduced size message included a message summary. The wireless device can make this determination using, at least in part, data that was included in the message, data that indicates a process by which a compression engine generated the message, e.g., a flag in memory, or another appropriate process. The wireless device can perform this step responsive, at least in part, to determining that the reduced size message was successfully sent.

Responsive to determining that the reduced size message did not include a message summary, the wireless device can stop performing the process 400. For example, the wireless device can wait to receive another message send request.

The wireless device generates a second message that does not include a message summary (418). For instance, responsive to determining that the reduced size message included a message summary, the wireless device can determine to send the second message that does not include the message summary. The second message that does not include the message summary can include the original message, or a reduced size message generated using a process other than message summary generation, e.g., using predetermined phrase coding, phrase likelihood prediction, or message encoding.

In some examples, the wireless device can analyze an updated connection quality for the wireless network after sending a reduced size message that includes a message summary. After sending the reduced size message, the wireless device can determine that an updated connection quality for the wireless network satisfies the connection quality threshold, e.g., the connection quality threshold that resulted in the wireless device generating the reduced size message with the message summary. Responsive to determining that the updated connection quality for the wireless network satisfies the connection quality threshold, the wireless device can send, via the wireless network, the second message to the destination device to which the reduced size message was directed.

The wireless device can perform any appropriate process responsive to determining that the updated connection quality does not satisfy the connection quality threshold. For instance, the wireless device can determine to wait until the connection quality improves. In some examples, the wireless device can determine to send the second message that does not include the message summary.

The second message, without the message summary, has more bits than the reduced size message and was generated using, at least in part, the message. For example, the second message can have the same body as the original message. The second message can be a reduced size message that otherwise does not include a human-readable summary.

The order of steps in the process 400 described above is illustrative only, and determining whether to send the reduced size message can be performed in different orders. For example, the wireless device can determine whether a reduced size message was included a message summary before determining whether the message was successfully sent via the wireless network.

In some implementations, the process 400 can include additional steps, fewer steps, or some of the steps can be divided into multiple steps. For example, the wireless device can perform steps 402, 410, and 412 without performing the other steps in the process 400. The wireless device can perform steps 402, 406, 410, and 412 without performing the other steps in the process 400. The wireless device can perform steps 406, 410, and 412 without performing the other steps in the process 400. Other combinations of steps are also considered.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 5:
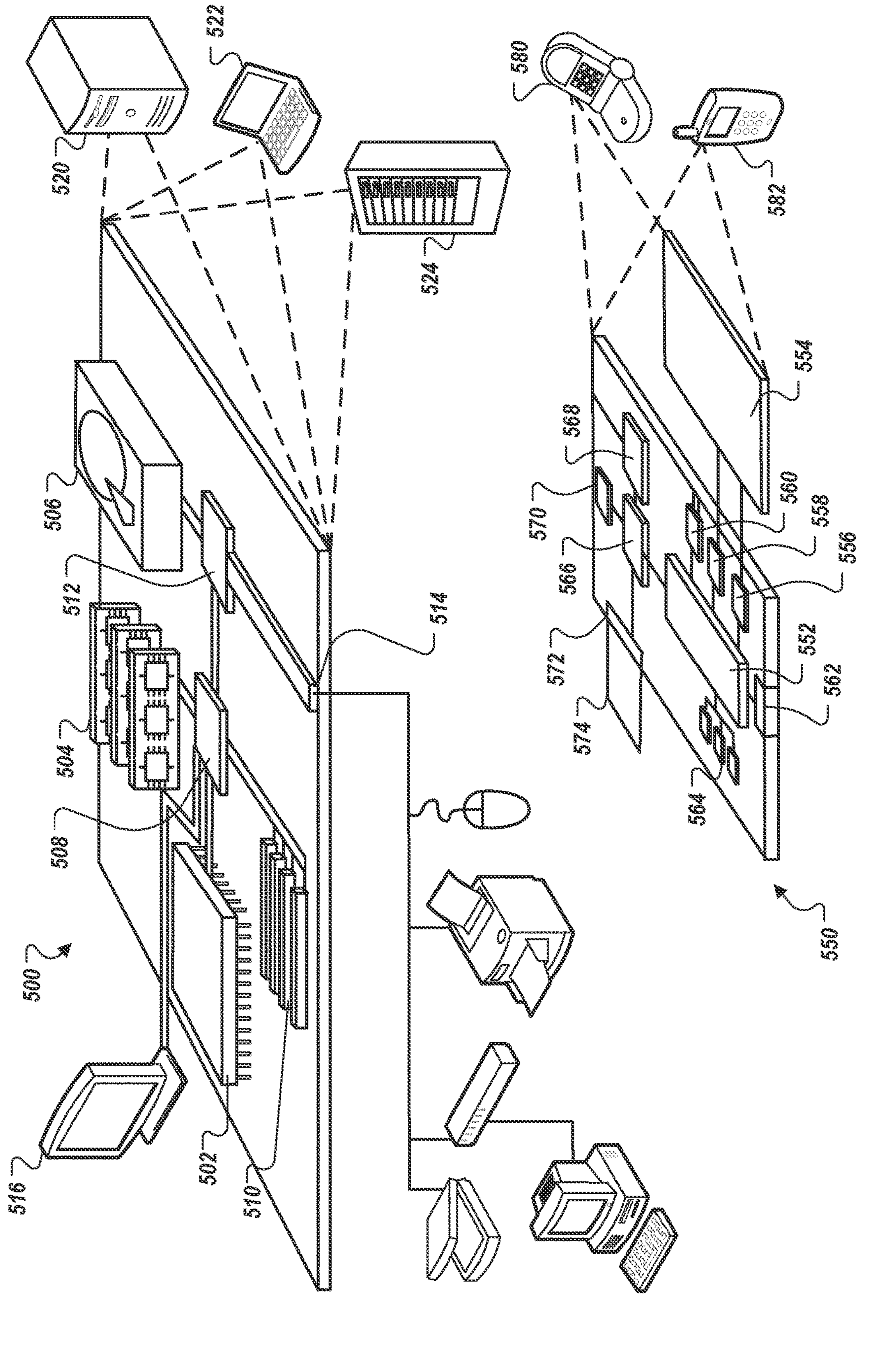
FIG. 5 is a block diagram of computing devices.

FIG. 5 is a block diagram of computing devices 500, 550 that may be used to implement the systems and methods described in this specification, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this specification.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 510. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device

500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer-implemented method comprising:

receiving, by a first device from a second device over a wireless network, a message comprising at least one element, wherein the message comprises a first data subset that includes the at least one element and a second, different data subset and the message that comprises the at least one element that indicates that the first device has a decompression engine for decompressing the message;

determining whether the at least one element was included in the received message and indicates that the first device is part of a predetermined system, the determining comprising determining whether the at least one element represents that the message does not comprise one or more phrases from an original message and indicates that the first device has the decompression engine;

determining whether to decompress the message using a first result of the determination whether the at least one element was included in the received message and indicates that the first device is part of the predetermined system, the determining comprising determining, by the first device, whether to decompress the message with the decompression engine using the first result of the determination, based on the at least one element indicating that the first device has a decompression engine for decompressing the message, that the at least one element represents that the message does not comprise the one or more phrases from the original message and indicates that the first device has the decompression engine; and performing one or more actions based at least on a second result of the determination whether to decompress the message.

2. The method of claim 1, wherein performing the one or more actions comprises:

based at least on determining to decompress the message, generating, based at least on the at least one element from the message, a decompressed message that includes one or more phrases from an original message; and performing the one or more actions based at least on the decompressed message that includes the one or more phrases.

3. The method of claim 2, wherein generating the decompressed message comprises reconstructing at least a portion of the original message based at least on the message and a decompression operation.

4. The method of claim 3, wherein the decompression operation uses a mapping of phrases to codes.

5. The method of claim 1, comprising:

determining whether the message comprises one or more phrases from the original message for the first device.

6. The method of claim 5, wherein:

determining whether the message comprises the one or more phrases from the original message for the first device comprises determining whether the at least one element comprises one or more key phrases and indicates that the message is not a reduced-size message of the original message; and performing the one or more actions is based at least on the one or more key phrases and responsive to determining whether to decompress the message based at least on the one or more key phrases.

7. The method of claim 5, comprising:

after receiving the message, receiving the original message that includes the one or more phrases; and performing one or more updated actions based at least on the original message that includes the one or more phrases.

8. The method of claim 5, wherein:

receiving the message comprises receiving, by the first device, the message that comprises the at least one element that indicates that the first device has a decompression engine for decompressing the message;

determining whether the message comprises the one or more phrases from the original message for the first device comprises determining whether the at least one element represents that the message does not comprise the one or more phrases from the original message and indicates that the first device has the decompression engine; and determining whether to decompress the message comprises determining, by the first device, whether to decompress the message with the decompression engine using the first result of the determination, based on the at least one element indicating that the first device has a decompression engine for decompressing the message, that the at least one element represents that the message does not comprise the one or more phrases from the original message and indicates that the first device has the decompression engine.

9. The method of claim 5, wherein:

the at least one element indicates that the first device has a predetermined address;

determining whether the message comprises the one or more phrases from the original message for the first device comprises determining whether the at least one element indicates that the first device has the predetermined address; and determining whether to decompress the message is based at least on determining that the at least one element indicates that the first device has the predetermined address.

10. The method of claim 5, wherein performing the one or more actions comprises presenting data for the one or more phrases and a location of the second device.

11. An apparatus for a first device and comprising processing circuitry and memory on which are stored instructions that are operable, when executed by the processing circuitry, to cause the processing circuitry to perform operations comprising:

receiving, from a second device over a wireless network, a message comprising at least one element, wherein the message comprises a first data subset that includes the at least one element and a second, different data subset;

determining whether the at least one element that was included in the received message a) represents that the message comprises one or more phrases from an original message for the apparatus and b) indicates that the message is not a reduced-size message of the original message, the determining comprising determining, based at least on the at least one element that was included in the received message, whether the at least one element indicates that the first device has a predetermined address;

using a first result of the determination whether the at least one element that was included in the received message a) represents that the message comprises the one or more phrases from the original message and b) indicates that the message is not a reduced-size message of the original message, determining whether to decompress the message, the first result including result data for using a first result of the determination whether the at least one element indicates that the first device has the predetermined address; and performing one or more actions based at least on a second result of the determination whether to decompress the message.

12. The apparatus of claim 11, wherein performing the one or more actions comprises:

based at least on determining to decompress the message, generating, based at least on the at least one element from the message, a decompressed message that includes one or more phrases from an original message; and performing the one or more actions based at least on the decompressed message that includes the one or more phrases.

13. The apparatus of claim 12, wherein generating the decompressed message comprises reconstructing at least a portion of the original message based at least on the message and a decompression operation.

14. The apparatus of claim 13, wherein the decompression operation uses a mapping of phrases to codes.

15. The apparatus of claim 11, wherein:

determining whether the message comprises the one or more phrases from the original message for the first device comprises determining whether the at least one element comprises one or more key phrases and indicates that the message is not a reduced-size message of the original message; and performing the one or more actions is based at least on the one or more key phrases and responsive to determining whether to decompress the message based at least on the one or more key phrases.

16. The apparatus of claim 11, the operations comprising:

after receiving the message, receiving the original message that includes the one or more phrases; and performing one or more updated actions based at least on the original message that includes the one or more phrases.

17. The apparatus of claim 11, wherein:

the at least one element indicates that the apparatus is part of an emergency service system;

determining whether the message comprises the one or more phrases from the original message for the first device comprises determining whether the at least one element indicates that the first device is part of a predetermined system; and determining whether to decompress the message uses the first result of the determination whether the at least one element indicates that the first device is part of the predetermined system.

18. The apparatus of claim 11, wherein performing the one or more actions comprises presenting data for the one or more phrases and a location of the second device.

* * * * *